United States Patent [19]
Ruby

[11] Patent Number: 5,232,762
[45] Date of Patent: Aug. 3, 1993

[54] PRODUCT OF A TWO PHASE, SELF CONFIGURING CORELESS STRUCTURAL ELEMENT FOR FURNITURE AND THE LIKE

[76] Inventor: Victor L. Ruby, 35606 Glenmore Ave., Balto, Md. 21206

[21] Appl. No.: 475,006

[22] Filed: Feb. 5, 1990

[51] Int. Cl.⁵ .............................................. B32B 3/28
[52] U.S. Cl. .................................. 428/167; 428/120; 428/137; 428/172; 428/213; 138/118; 52/631; 52/807
[58] Field of Search ............... 138/118, 120, 128, 151, 138/156, 158; 428/167, 174, 176, 182, 120, 72, 131, 137, 172, 178, 213; 52/630, 631, 806, 807, 815

[56] References Cited

U.S. PATENT DOCUMENTS

| | | | |
|---|---|---|---|
| 2,181,164 | 10/1939 | Alexander | 52/631 |
| 2,253,219 | 8/1941 | Alexander | 52/631 |
| 3,117,902 | 1/1964 | Holzheimer | 156/217 |
| 3,557,840 | 1/1971 | Maybee | 52/631 |
| 4,402,170 | 9/1983 | Seidner | 52/631 |

*Primary Examiner*—Donald J. Loney
*Attorney, Agent, or Firm*—Watson Cole Grindle & Watson

[57] ABSTRACT

A structural element for initial, substantially flat attachment to the surfaces of high impact sheet materials, and adapted for attachment to curved surfaces, includes: a first resilient, semi-flexible, sheet material having a given length and width; a second, flexible sheet material of substantially the same width as the first sheet material; a plurality of parallely-spaced, independent preformed rib members sandwiched between the first and second sheet material and each rib member extending substantially across the width of the first and second sheet material and fixedly attached to both the first and second sheet material by an adhesive with the first and second sheet material being flat, the width and height of the preformed rib members and the distance between adjacent rib members determining the limit of bending of the first or second sheet material; and at least one of the first and second sheet material being shearable, thereby enabling areas and the degree of bending within the areas of the first and second sheet material to be determined by the selective cutting of only the at least one sheet in the spaces formed between the plurality of rib members. In an alternate embodiment only one sheet of flexible material is used and the bending of the structural element is determined solely by the spacing between the rib members and their height and width.

12 Claims, 4 Drawing Sheets

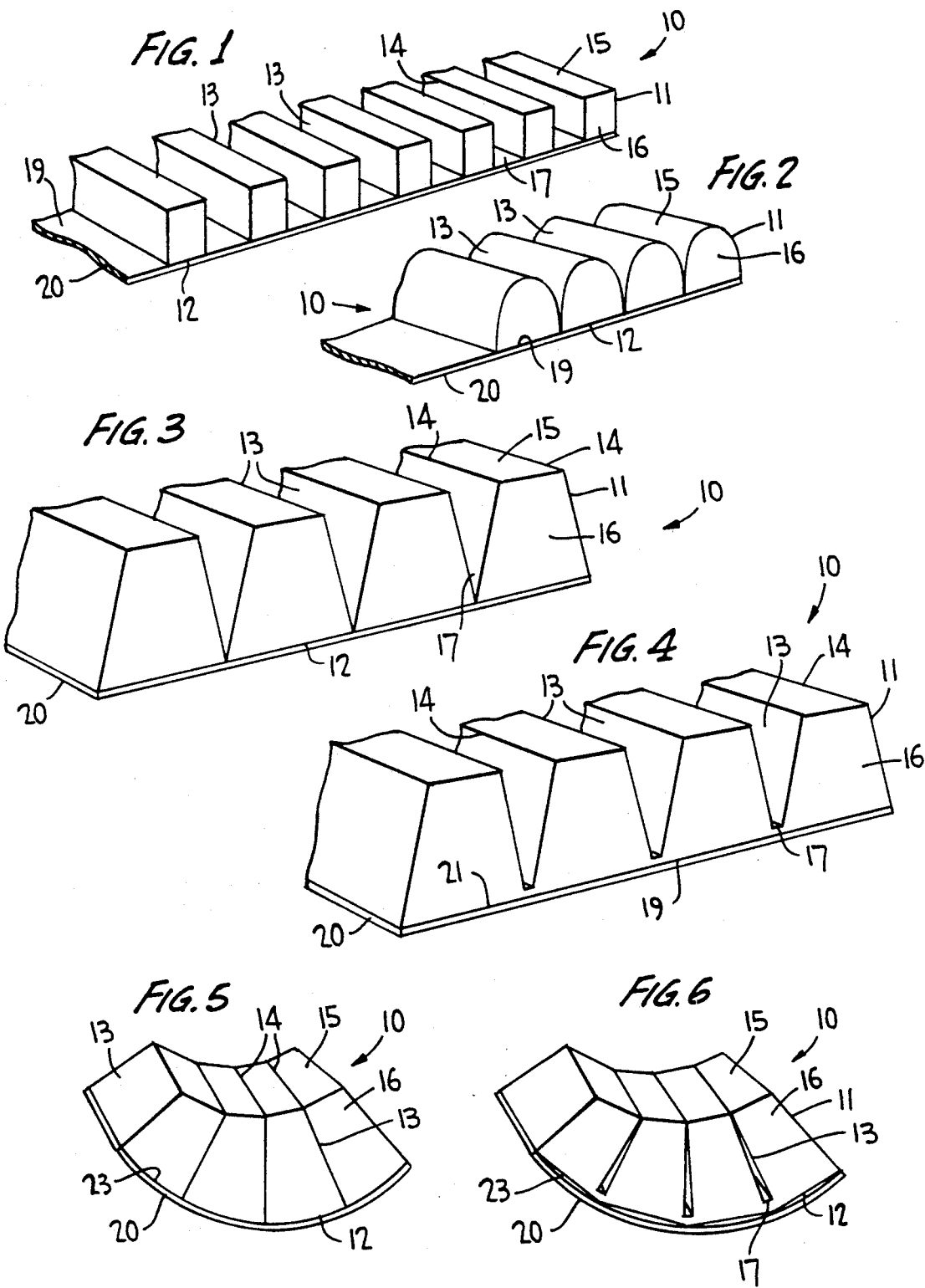

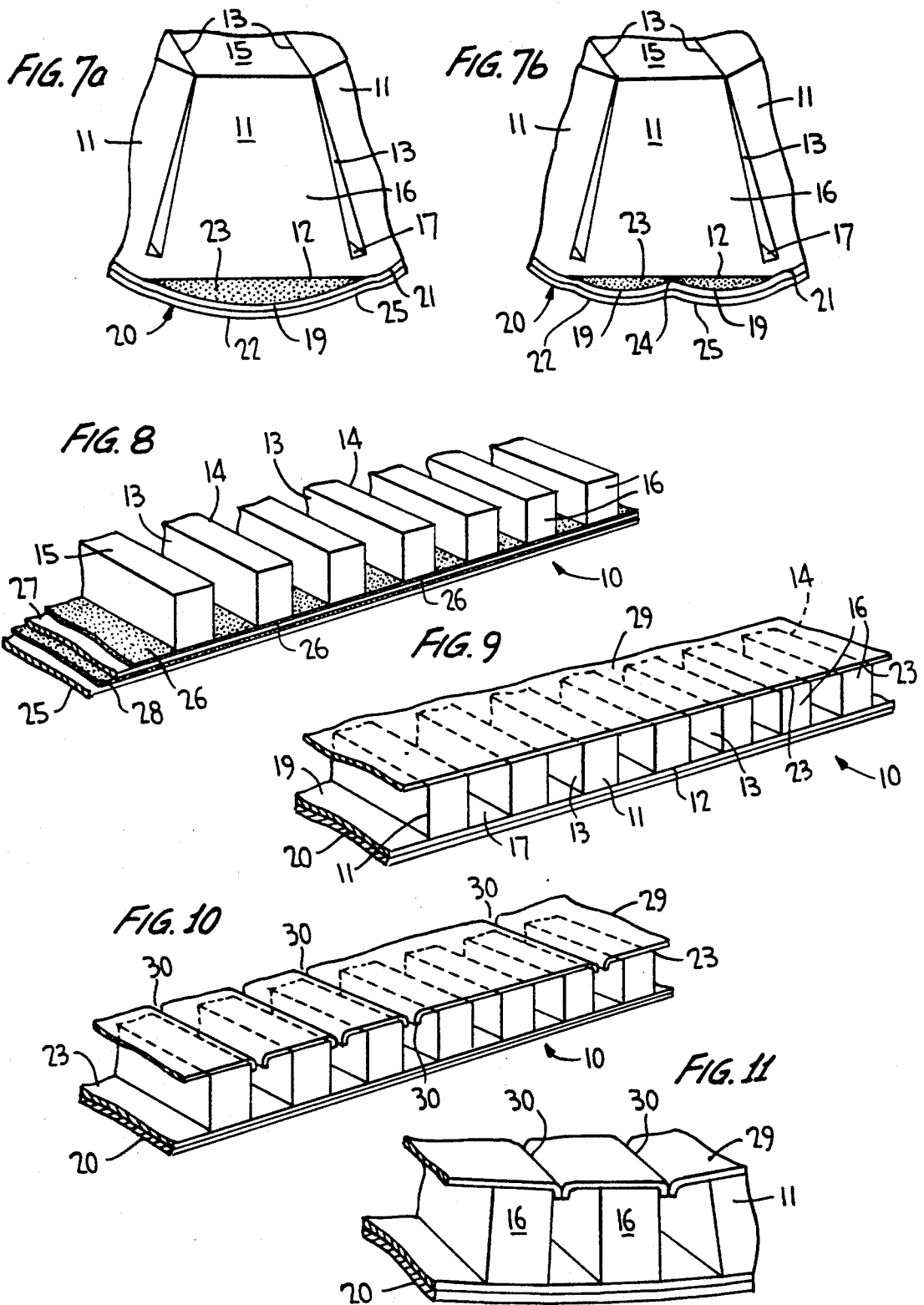

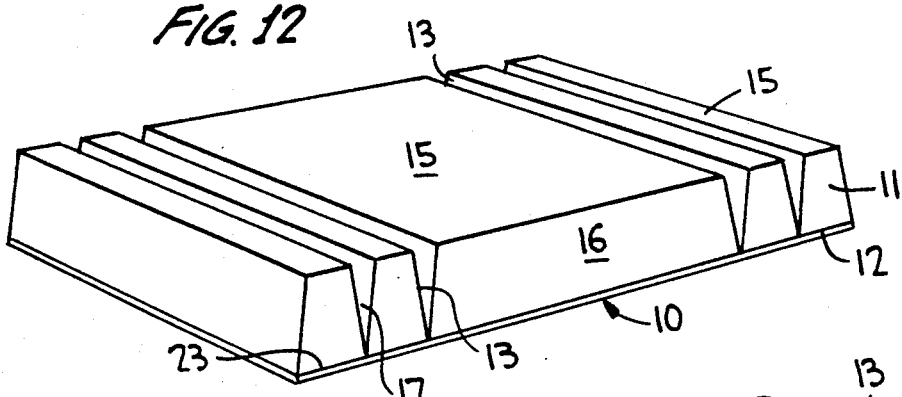
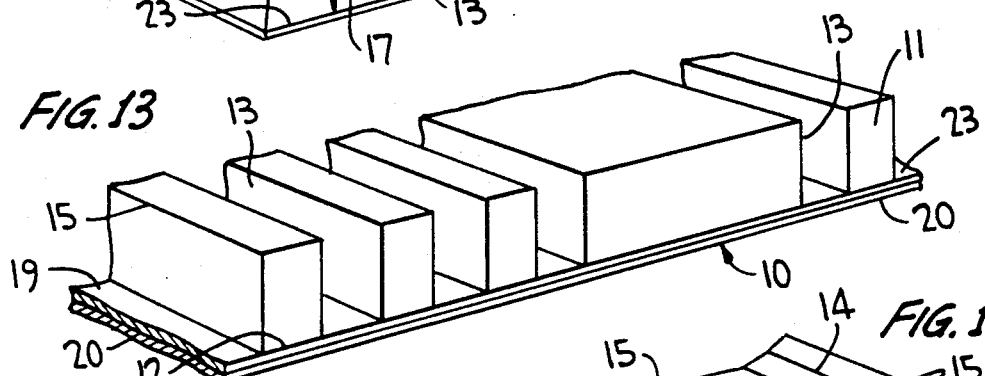
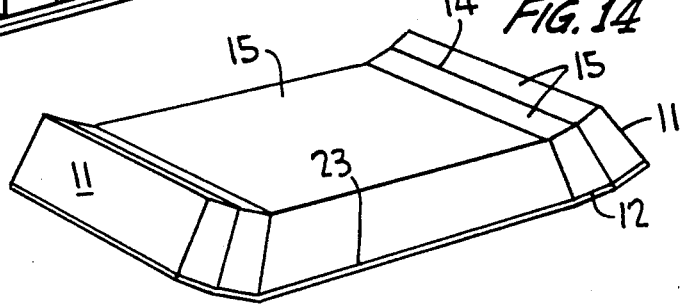
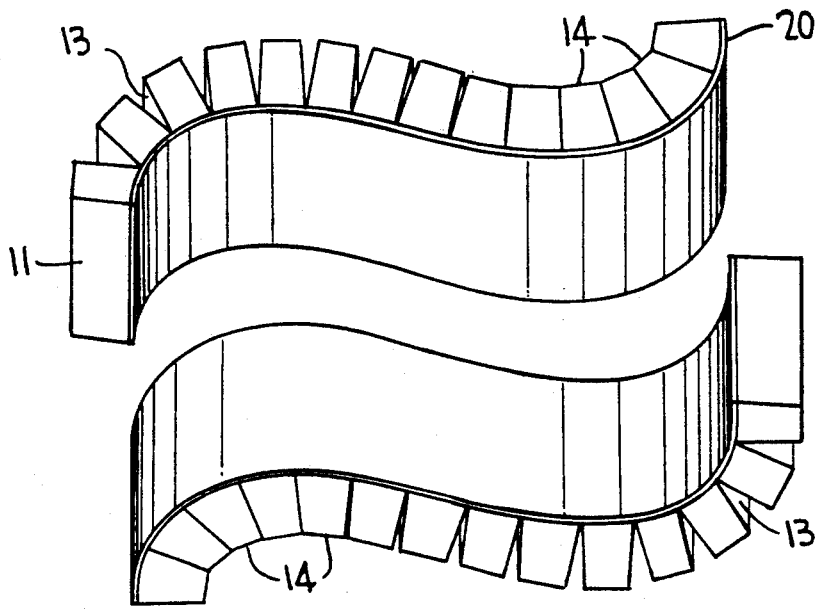

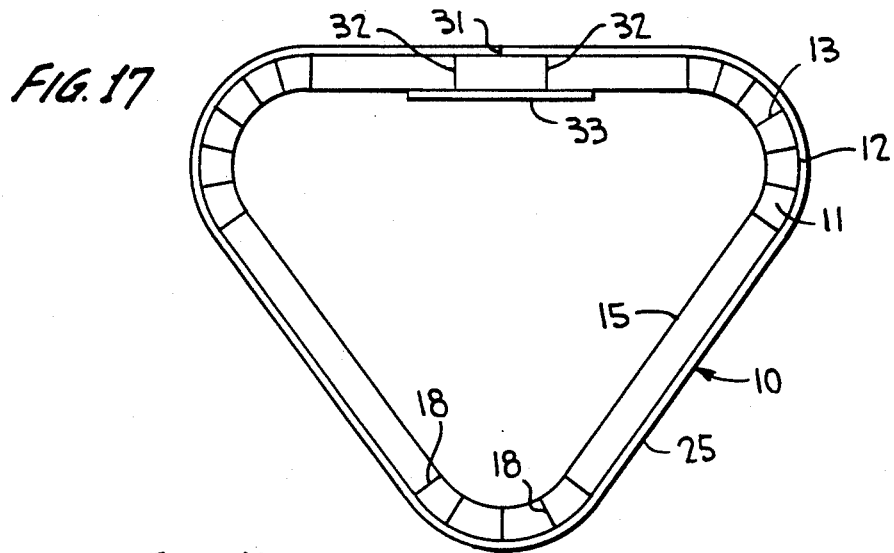
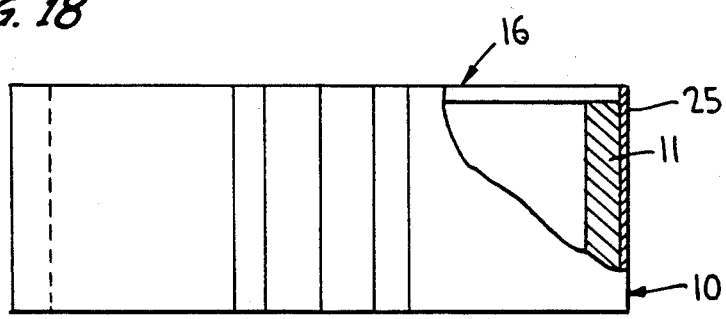
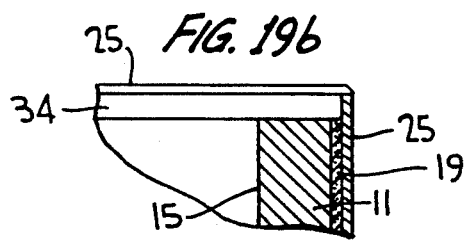
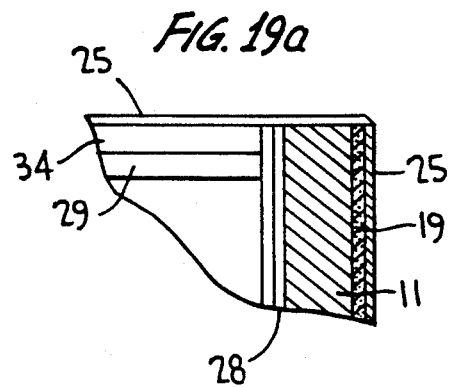
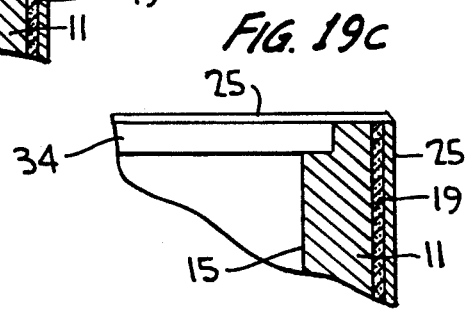

PRODUCT OF A TWO PHASE, SELF CONFIGURING CORELESS STRUCTURAL ELEMENT FOR FURNITURE AND THE LIKE

BACKGROUND OF THE INVENTION

The present invention relates to the method of producing a structure for furniture and furniture components; and relates to the furniture and furniture components produced thereby.

In the art of fabricating furniture and like structures and furniture elements; having at least one curved or radiused, belt-like surface, these structures have been, usually, fabricated by purchasing or making a (stick built) form, which is later in a single operational phase surfaced with an attached facing of semi rigid laminate such as "Micarta", "Formica", and the like.

Fabricating these curvealinear, normally hollow, furniture pieces, has been historically performed by assembling the ribbed core or mandrel structure, and then applying and attaching a semi-flexible, primed or finished flat belt-like sheet material capable of relatively easy bending. If desired, rigid end pieces are then attached to the open ends formed by the perimeter of the sheet material after it is bent to make a simple or compound curved closed structure. To finish the assembly, end (top and bottom) pieces are attached to the inner face of the curved end pieces thus the joining edges are made flush to finish the piece of furniture. This method can be, and has been, characterized as "cored cabinetry" (or pre-built) furniture construction. In this construction, as well as in the subject invention, the laminate sheet material is curvable primarily in a first direction, and remains substantially straight in the direction perpendicular to that first direction.

However, this historic fabricating method has the distinct disadvantage that it requires excessive amounts of storage space; for the purchase or fabrication and storage of the stock cores of many shapes and sizes needed, also for the considerable amount of "stick" lumber. The old method is prone to form bubbles of irregular adherence between the laminate and the core, and is some times subject to delamination. It is also a disadvantage that there are extra steps in the custom fabrication by the method of the present state of the art, that require a considerable amount of extra labor. These extra steps are not required by the subject invention.

The following references were found to be of interest:

| U.S. PAT NOS. | | |
| --- | --- | --- |
| A | B | C |
| 1. 4,468,273 | 4,452,657 | 4,428,791 |
| 2. 3,821,051 | 3,809,598 | 3,637,446 |
| 3. 3,554,624 | 3,546,771 | 3,509,005 |
| 4. 3,376,185 | 3,295,279 | 3,110,369 |
| 5. 2,967,593 | 2,890,739 | 2,815,795 |
| 6. 2,371,754 | 2,339,113 | 2,220,898 |
| 7. 1,090,593 | 220,893 | |

Close approach to the present inventive method and proposed construction and product was not observed in the above cited references. Accordingly, the patents cited above and their patents of reference should be considered as being of general interest and illustrative of the scope of the available art. None, appear to be close, in method or product produced thereby, to the herein proposed inventive concept.

By the new and practical teaching of this invention the sheet like structure is adhered to, or formed with selected rib like structures in the flat condition, that provide by rib to rib interference when closed in a belt-like loop, the required curved or compound curved, auto-radiused furniture, or furniture like elemental structure. This action is referred to as "self configuring". The new art disclosed, as opposed to hands on manufacture, allows automated radiused manufacture, by a "just in time" custom manufacturing method and the manufactured products produced, in this industry for the first time.

SUMMARY OF THE INVENTION

The invention comprises a method and the product produced by the method which is accomplished by; shaping or forming, cutting molding, extruding, or attaching; one or more variable rib-like elements of a semiflexible sheet, produced in parallel spaced relationship, rib-like structures on at least one face of semi flexible, substantially flat sheet web. This is done in a predetermined pattern of rib shapes and sizes. The closeness and shape of the ribs controls and determines the minimum curve radius of any subsequently closed web curve or compound curve, by rib to adjacent rib interference. This predetermined belt-like structure with or without end pieces can then be used as furniture or as a furniture component.

Curving the web positively or negatively in a direction parallel to the rib like structures, until the two web ends can be selectively attached to each other, or to other furniture elements can form a belt like web having minimum radius components. This structure may be limited by the compressive interference between the adjacent edges, away from the web base, of neighboring ridge edges of the rib-like structure.

The ultimate shape of the assembly can be determined by combining the belt assembly, above, with one or more separate rigid flat geometric shapes applied to the ends of rib until located and controlling within the face of the belt like structure. This determines the final shape of the assembly. The subject invention allows new artistic freedom including the use of involute and volute curves for furniture construction, without the requirement of making a preform or core.

BRIEF DESCRIPTION OF THE DRAWINGS

FIG. 1, is a edge on view along the length of the semiflexable sheet material of the subject invention in the first stage (in the flat condition), with rectangular rib elements attached.

FIG. 2, is the same view of the invention shown in 1, above except showing round top rib elements attached (similar but not the same as tambour).

FIG. 3, is the same view of another embodiment (having trapezoid like rib elements).

FIG. 4, is the same edge on view of the subject invention shown in FIG. 3, above, wherein the trapezoid ribs have been formed, shaped, attached or moulded with a portion of the rib material left to keep the rib bases in a spaced relation with each other.

FIG. 5, is an end on, enlarged view of the rib element detail of the structure bent to the interference limit, according to the method herein of the invention shown in FIG. 5.

FIG. 6 is an edge on view of another embodiment of the subject invention wherein the ribs have been formed in a spaced relation from each other while flat; then bent until the apex corner limiting curve condition is reached. This view also shows the partial and controlled delamination process forming a smooth non 'telegraphing' curve of the semiflexible web.

FIG. 7a is an enlarged view of a portion of the above subject invention shown in FIG. 6 showing the semi flexible sheet material adhered (without the "telegraphing" problem) to the carrier sheet or web which in turn is fastened to the rib base face.

FIG. 7b is the same view of the same part of the invention showing the failure of the adhesive delamination control, resulting in curved web "telegraphing".

FIG. 8 is an edge on stylized view of another embodiment of the subject invention with the four layer rib base contact construction.

FIG. 9 is an edge on stylized view of the embodiment of the invention shown in FIG. 5 above, showing the addition of a rib apex web attached friable web.

FIG. 10 is the same view of the invention shown in FIG. 9 after the friable web has been broken or bent against the ribs apex face, and forced into the space between the ribs.

FIG. 11 is the same view of a portion of the invention shown in FIG. 9 bent as shown to the limit restricted by the interference of the broken or bent edges of the apex contact web.

FIG. 12 is an edge on view of another embodiment of the subject invention wherein the ribs are of varying widths to allow compound curve fabrication of furniture, and furniture parts such as are shown in FIG. 17 below.

FIG. 13 is the same as FIG. 12 above, except that rectangular ribs are shown, instead of trapezoidal.

FIG. 14 is again the same as FIG. 12 above, bent to the position of interference limitation.

FIG. 15 is another embodiment of the subject invention, bent to the position of interference limitation in part and not in part to form an "s" curve.

FIG. 16 is the female "tool" embodiment of the subject invention, bent to the position of interference limitation in part and not in part to form an "s" curve, against which fir 15 is formed in part.

FIG. 17 is the plan view of a triangular table showing the completed rib structure for a radiussed corner triangular table, before the geometrical top is emplaced.

FIG. 18 is the partial cut away, elevation view, of the same table as shown in FIG. 17, with the geometrical top control surface in place, within the external semi flexible web, and on the top end of the rib structure.

FIG. 19a is an enlarged portion of the cutaway of FIG. 18, showing a method of placing the geometrical top.

FIG. 19b is an enlarged portion of the cutaway of FIG. 18, showing an alternate method of placing the geometrical top.

FIG. 19c is an enlarged portion of the cutaway of FIG. 18 showing the bevel of the top finished surface element.

THE DESCRIPTION OF THE PREFERRED EMBODIMENTS

FIG. 1 shows an edge on view of the rib elements 11 of the subject invention 10, that have at least one flat face, called the rib base face 12. These ribs 11 are placed in parallel adjacent-base-spaced relationship with each other, and have their flat base face 12 fastened, by adhesive, or other means known in the trade, to the face 19 of the carrier or semi-flexible sheet web 20. The method of adhesive fastening the face 12 of the rib elements 11 to the face of a carrier or semi-flexible sheet material 20 in the flat condition. This assembly has been achieved prior hereto in objects such as "tambour". The method of arranging the ridge or rib like elements 11, and the choice of fastening compositions and the functional properties resulting there-from are important to the unobvious novelty of this disclosure and are disclosed hereinbelow.

In FIG. 2 another embodiment (having ribs of semi-circular cross section) is shown. While this rib configuration appears like the device known in the prior art and called "tambour" (which is the flexible roll of an old fashioned "roll top desk"). The relationship of the length of the ribs to the width of the flexible web, the adjacency of the semicircular rib elements is quite different and affects the structure and the function of the resulting combination of similar but not same elements. In FIG. 3 there is shown another embodiment (having trapezoid like rib elements) that are placed in close adjacency. In FIG. 4, there is shown the same edge on view of the subject invention shown in FIG. 3, above, wherein the trapezoid ribs have been formed, shaped, attached or moulded, with a portion of the base of the rib material left intact, or not removed, in order to keep the rib bases in a larger spaced relation with each other.

The various forms of assembly of rib elements 11 described above are attached to the semi-flexible sheet 20, and this assembly can be then stressed to curve it in the direction shown in FIGS. 5,6,7,15, and 17 (so that the bending action brings the facing faces 13 of the rib elements 11 into adjacency), the uniformity of the curve and the curving action is limited by the height, width and shape of the ribs which affects the interference or juxtaposition of one face FIG. 5, or corner 14 FIG. 6 of one rib element 11 against the face 13 or corner of apex face 14 of a second adjacent rib element 11.

There are stresses and strains opposing the tendency of the fastening or adhesive composition, which stresses and strains, as measured and controlled determine the resulting smooth appearance of finished external web 20 after being ribbed, attached, and curved to a selected shape. As can be seen in the magnified view shown in FIGS. 5, 6, and 7 the adhesive 23, which is applied in the flat condition, begins to "delaminate" or expand in response to the bending action supported by the bending of the ribs 11 adjacent to the subject rib 11. Slightly exaggerated (for clarity) in FIG. 7b, if the adhesive or fastening is too strong, a dimple forms, distorting the finished curve of the web 20 and its external web face 25, to the same extent that the adhesive 23 fails do allow delamination. This failure of the adhesive to delaminate is shown at 24. There is also shown FIG. 7a, in exaggerated view the adhesive 23 distortion 21 that forms; at the rib 11 hinge joint, opposite the kerf space 17, by the pressure of the bending of the material sandwich (including the rib material spanning the kerf between the rib) space 17. The details of the importance of the properties of the fastening composition 23 can be better understood by referring to FIG. 7a, which is an enlarged representation of a first rib element 11, and a portion of each of the two adjacent rib elements 11, to either side of the first rib element as they are placed in a condition of face to face compression from the curving stress. This occurs in the ribs that have been previously attached to the face, of the semi flexible sheet material 20, as the semi-flexible sheet is being bent or curved.

Fastening is achieved by an adhesive composition, which is cured while the sheet material is in flat condition, FIG. 1. After the adhesive composition has "set", this assembly of rib elements 11, and sheet material 20 may be bent to the limit dictated FIGS. 4, and 5, by the interference of the adjacent rib faces 14 which produces a curved furniture piece or element; as shown in FIG. 17 without the necessity of producing as an extra and prior step, a separate core shape to which the semiflexible sheet can be later adhered in a curved position. This action FIG. 7a, also tends to stretch the adhesive composition (i.e. in tension) except in the center, FIG. 7b,, of the face 24 when delamination does not occur, and compress the adhesive at the corners 17 or edge of the base face 12, as well as, under some extreme conditions, tend to force the individual rib 11 in the direction parallel to the plane of the sheet material 20.

By controlling the properties of the adhesive material in accordance with the teachings shown herein, "telegraphing" at the center of the rib face or cracking of the laminate at the edges of the rib face can be minimized. The parameters of the adhesive and spacer or carrier sheets can be adjusted to completely eliminate "telegraphing" or cracking in the web finished face 25. If the adhesive is "too strong-or not forgiving enough" the plane of attachment of the rib element 12 will be "telegraphed" through the laminate and produce the result shown in FIG. 7b,.

Another embodiment FIG. 9, of the invention can best be understood by examining FIG. 12 which is the same end on view of the assembled rib elements 11 and the sheet material assembly 20, and 19,. In this embodiment the rib elements 11 are of rectangular cross-section fastened to the semiflexible sheet 20 by the rib base faces 12, and there is a second semiflexible sheet material adhesively fastened to the remaining and now exposed rib apex faces 14, of the rib elements 11.. This second sheet may additionally have the property of being easily fractured (friable) so that a very simple tool similar to a pizza cuter or screen bead impressing or embossing tool can, simply, with normal one man hand pressure break or fracture 30 this second sheet 29 (in the space between the edges 14 of adjacent ribs); and thus leave bent, broken or fractured edges 30 as shown in FIG. 11. This will allow a limited bending action as described above and produce a semiflexible sheet 20 curve bending limited edge interference 30 as shown in FIG. 11.

By carefully selecting the kind of ribs (i.e. trapezoidal, rectangular, or triangular narrow or wide, in cross-section) and spacing the base of the ribs (adjacent or in near adjacency) the finished interference limited curves produced, can be controlled and limited, independently of the skill of the assembly curving operator. By controlling the properties of the adhesive composition the appearance and quality of the finish of the belt can be controlled. After the curvealinear substantially tubular assembly FIG. 17 is formed, a top geometrical curve controlling shape 16 is inserted within the belt like sheet material 25, and sometimes also a bottom shape or rigid piece of wood or similar material is similarly inserted at the base.; The inserted curve controlling pieces 16 must have a periphery length that is nearly identical with the length of the interior surface of the external tubular belt formed sheet face 25. In order to facilitate the insertion, the opening can form a ledge by making the length of the rib elements 11 shorter than the full width of the sheet like material 20 by a distance that is equal to the thickness of the top 16 and or bottom inserts. The product disclosed in FIGS. 8, 9, 11 and 12, and 4 can in another embodiment have friable sheet-like material on both faces as shown in FIG. 10, and then by selectively breaking the space between the rib like elements 11, both as to location, frequency, and width of the breaks 28, and also as to which or whether both of the sheet like surfaces are broken. Thus a serpentine or sinuous bend can be produced FIGS. 15, and 16, as a furniture or structural element.

A modification of the invention is shown in FIG. 8, wherein the ribs 11 are attached to a carrier sheet or web 27 by adhesive 26, in the flat condition then, after the first adhesive 26 has cured, subsequently the carrier sheet 27 is further adhered to the finished external face 25 of the semiflexible sheet 20 by adhesive layer 28. This allows more flexibility of finished design parameters by combining the tensile and cushioning properties of two adhesives and the intermediate web.

When joining the ends of the laminated or formed structure described above the ribs 11 are eliminated from the last or joining 31 position FIG. 17, a separate lapping piece 33 is then positioned adjacent the inside face of the assembly and adhered thereto, and this forms the closing of the belt like structure.

The insertion of the curve controlling shape 16 to achieve the neat edge joint can be achieved in several ways, each with a different advantages. In FIG. 19a, the shape 16 is comprised of the rigid shape portion 34 and its external finished portion 25, which is usually the same material as the semiflexible sheet 20, but not necessarily. In FIG. 19a, sheet 25 extends a uniform amount beyond sheet 34 so that it acts as a stop to prevent the control shape from dropping thru. In FIG. 19b both the external sheet and the underlying sheet rest on the ends of the ribs 11 to facilitate gluing. In FIG. 19c, the curve controlling sheet only proceeds halfway toward the periphery in a joint known as a rabbet.

I claim:

1. A structural element for initial, substantially flat attachment to the surfaces of high impact sheet materials, and adapted for attachment to curved surfaces, comprising:
   a first resilient, semi-flexible, sheet material having a given length and width;
   a second, flexible sheet material of substantially the same width as said first sheet material;
   at least one of said first and second sheet material being shearable;
   a plurality of parallely-spaced, independent preformed rib members sandwiched between said first and second sheet material and each said rib member extending substantially across the width of said first and second sheet material and fixedly attached to both said first and second sheet material by an adhesive with said first and second sheet material being flat, the width and height of said preformed rib members and the distance between adjacent rib members determining the limit of bending of said first or second sheet material; and
   the selective cutting of the spaces between said rib members so that the degree of bending of said first and second sheet material is determined by the number of spaces cut between said plurality of rib members.

2. The structural element as claimed in claim 1, wherein each of said plurality of rib members is substantially thicker than each of said first and second sheet material.

3. The structural element as claimed in claim 1, wherein both said first and second sheet material are made of a shearable material.

4. The structural element as claimed in claim 1, wherein at least one of said first and second sheet material is a high impact surfacing sheet-like material.

5. The structural element as claimed in claim 1, further comprising a curvilinear-shaped control surface, said second sheet material being attached to the curvilinear-shaped control surface such that said first and second sheet material and said plurality of rib members substantially conform to the shape of said curvilinear-shaped surface by the selective cutting of said at least one sheet material and the bending of the structural element to conform to the surface of said curvilinear-shaped control surface.

6. A structural element as claimed in claim 1, wherein said first and second sheet material and said rib members sandwiched therebetween form a substantially self-supporting curvilinear-shaped structure.

7. The structural element as claimed in claim 6, wherein each of said plurality of rib members is substantially thicker than each of said first and second sheet material.

8. The structural element as claimed in claim 6, wherein both said first and second sheet material are made of a shearable material.

9. The structural element as claimed in claim 6, wherein at least one of said first and second sheet material is a high impact surfacing sheet-like material.

10. A structural element as claimed in claim 1, wherein the selective cutting of said at least one sheet leaves fragmented portions of said at least one sheet in the spaces formed between said plurality of rib members, thereby limiting the degree of bending of the structural element.

11. The structural element as claimed in claim 1, wherein said preformed rib members extend over substantially the full length of said first and second sheet material.

12. The structural element as claimed in claim 1, wherein said preformed rib members extend over preselected portions of the length of said first and second sheet material.

* * * * *